Oct. 19, 1926.
H. H. CRAWFORD
WOODWORKING MACHINE
Filed Dec. 4, 1925
1,603,583
7 Sheets-Sheet 1
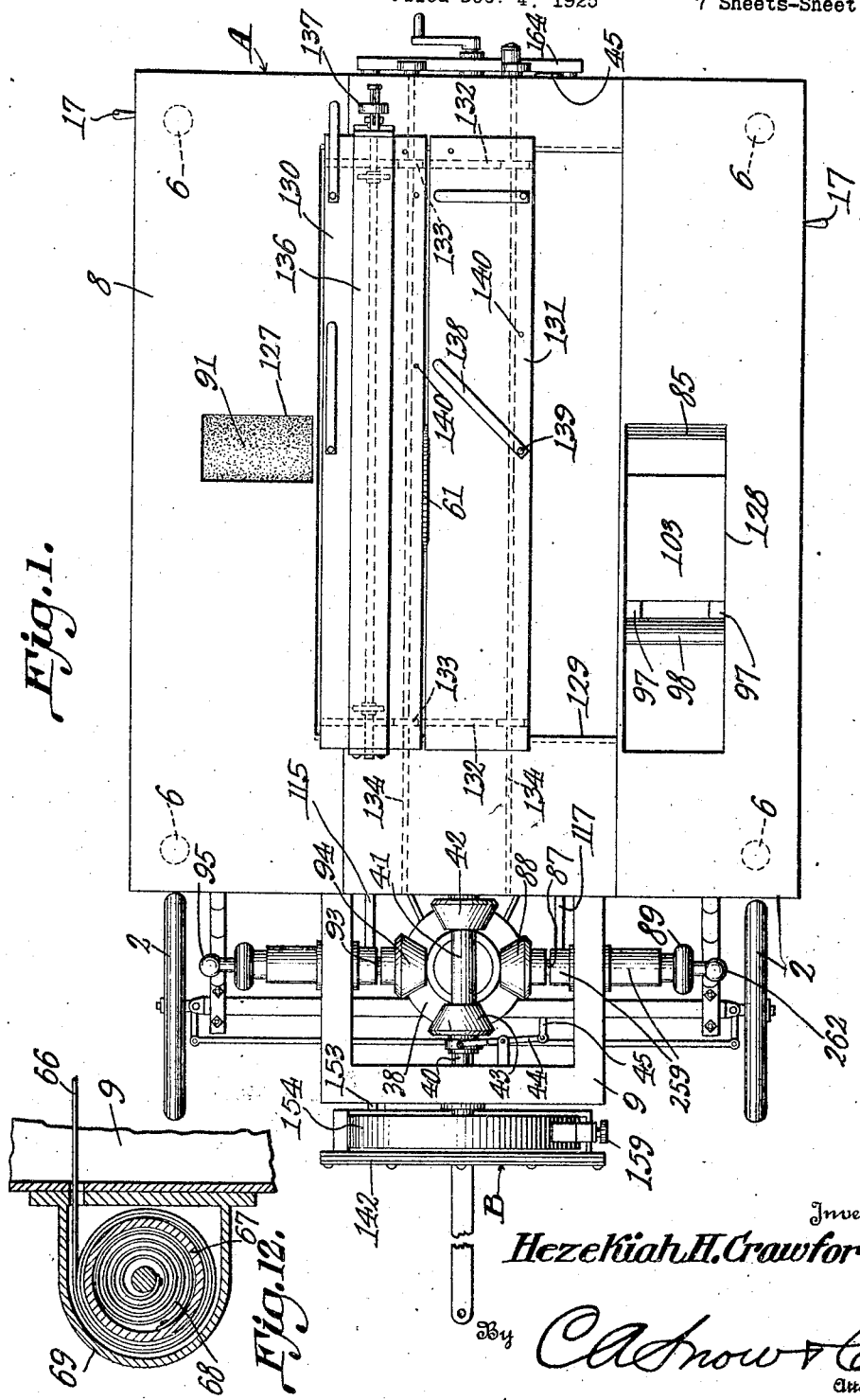

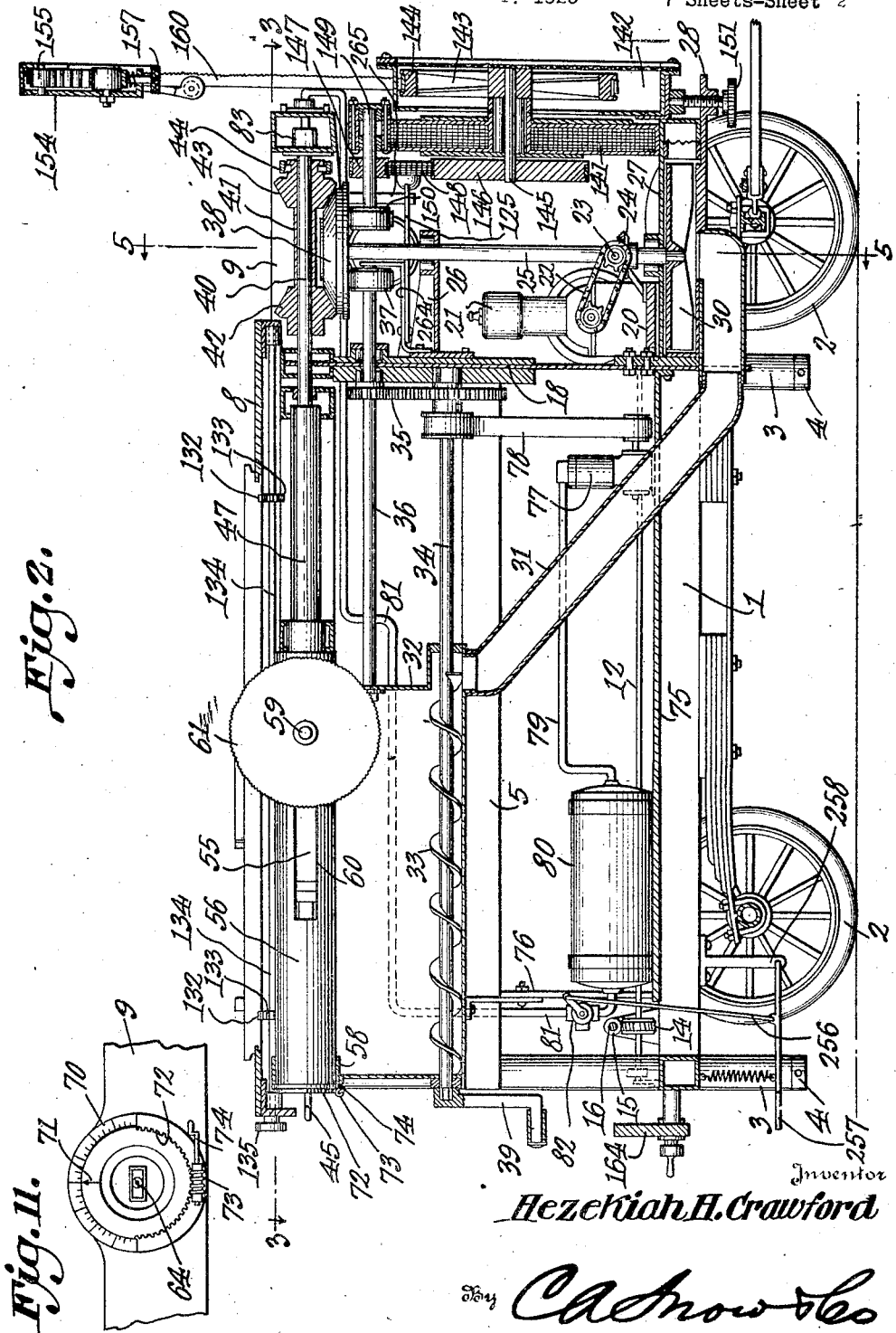

Oct. 19, 1926.  
H. H. CRAWFORD  
WOODWORKING MACHINE  
Filed Dec. 4, 1925  
1,603,583  
7 Sheets-Sheet 3
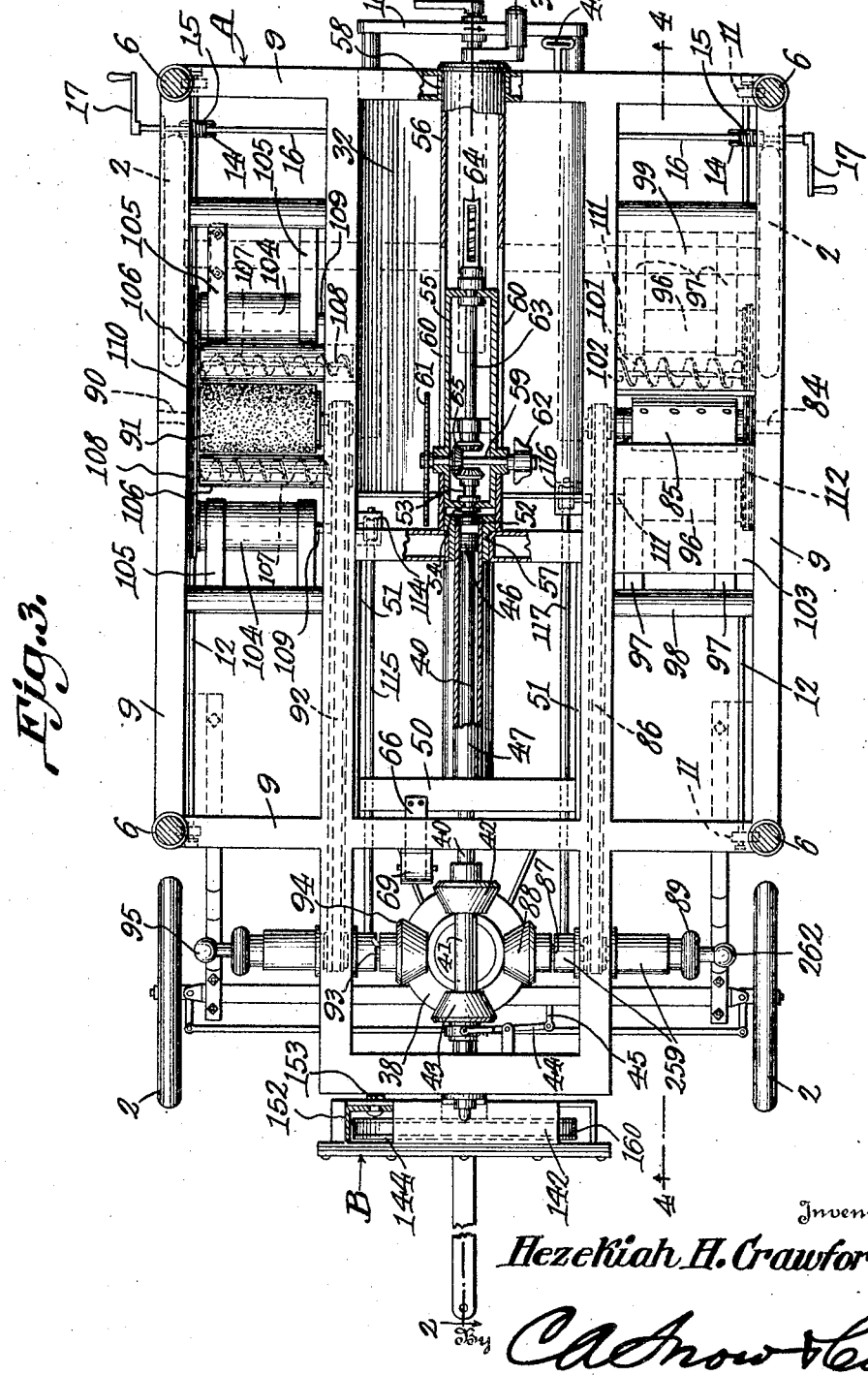
Inventor  
Hezekiah H. Crawford  
by CA Snow & Co  
Attorneys

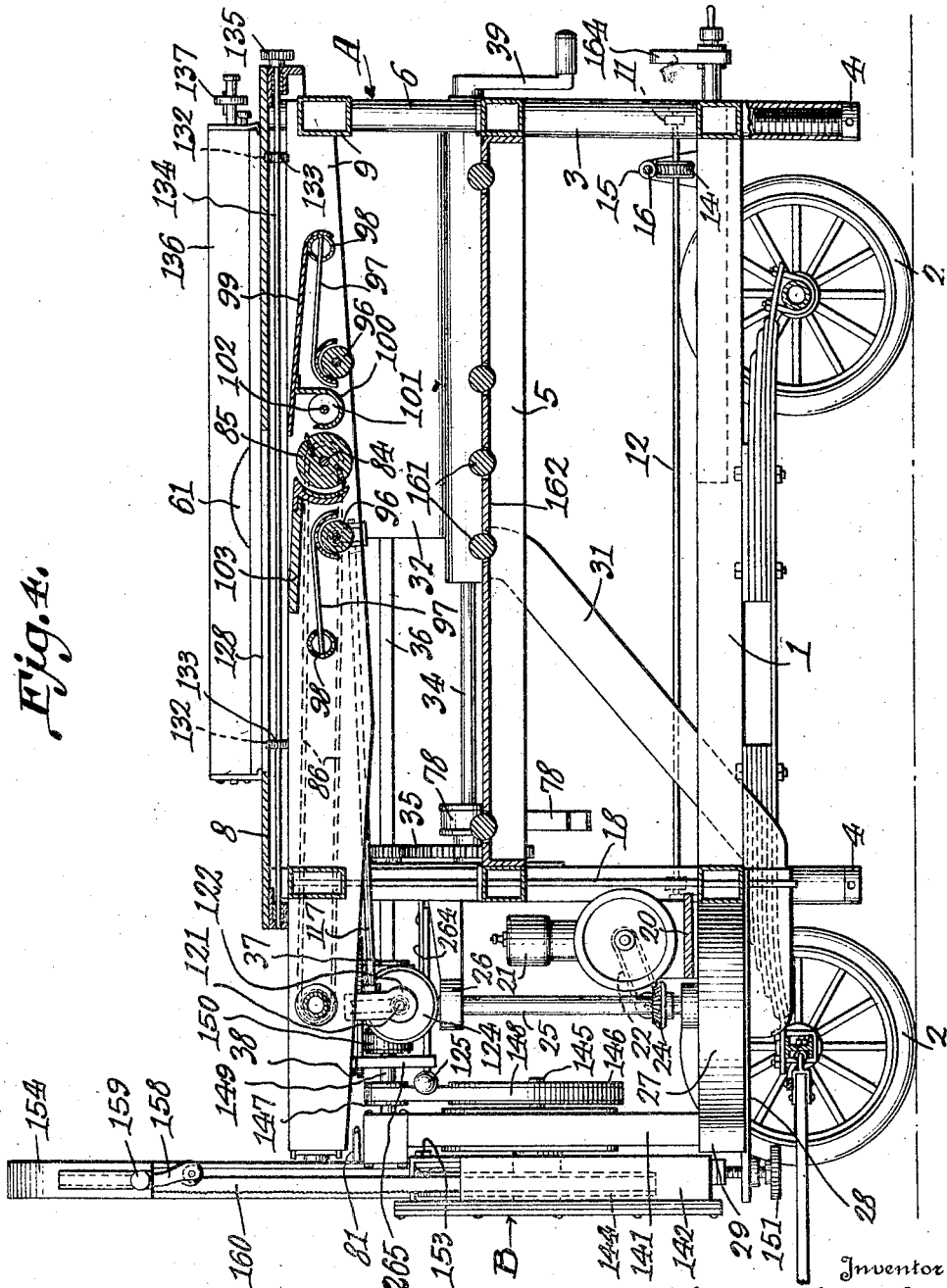

Oct. 19, 1926.

H. H. CRAWFORD 1,603,583

WOODWORKING MACHINE

Filed Dec. 4, 1925    7 Sheets-Sheet 5

Inventor

*Hezekiah H. Crawford*

By *C A Snow & Co*

Attorney

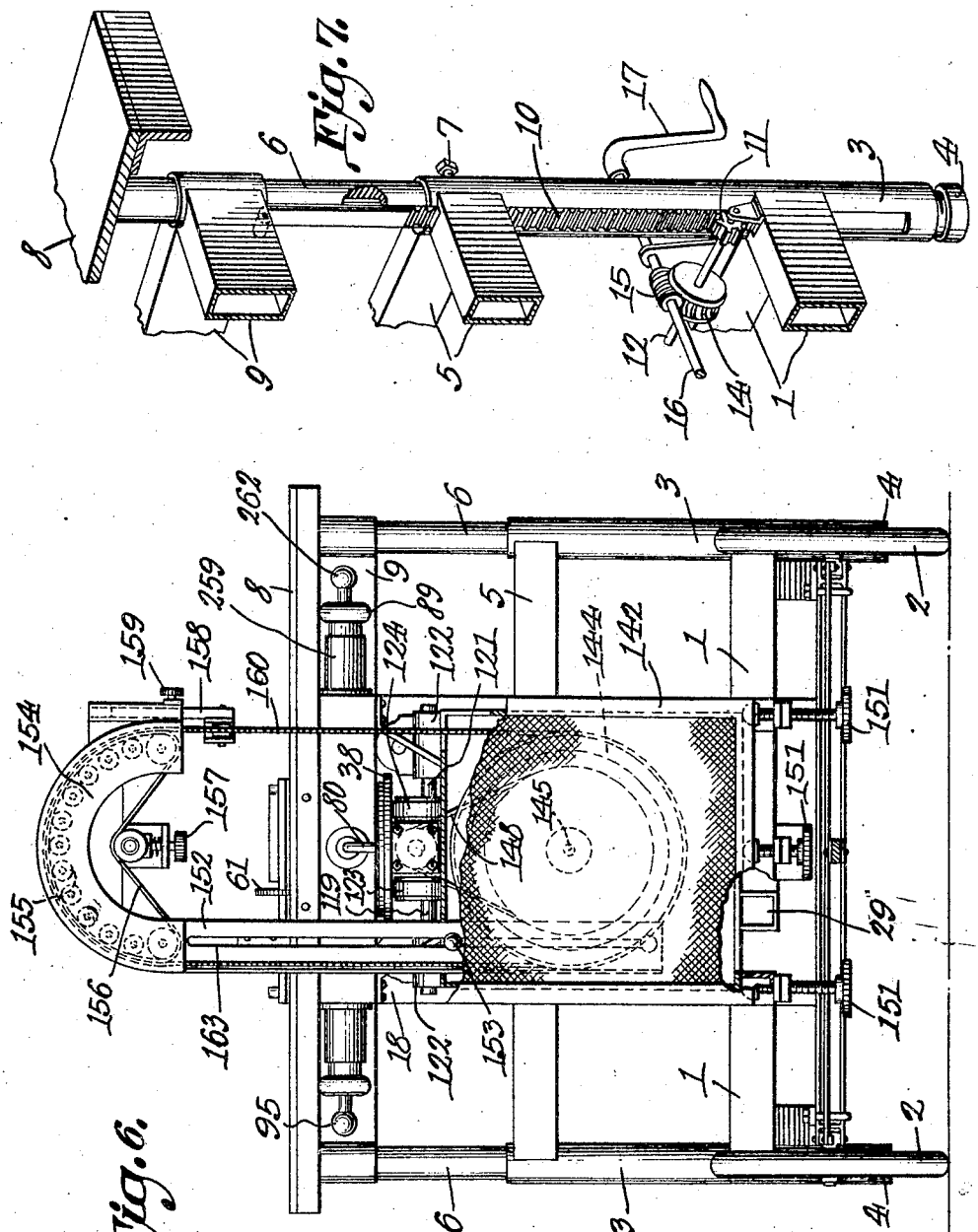

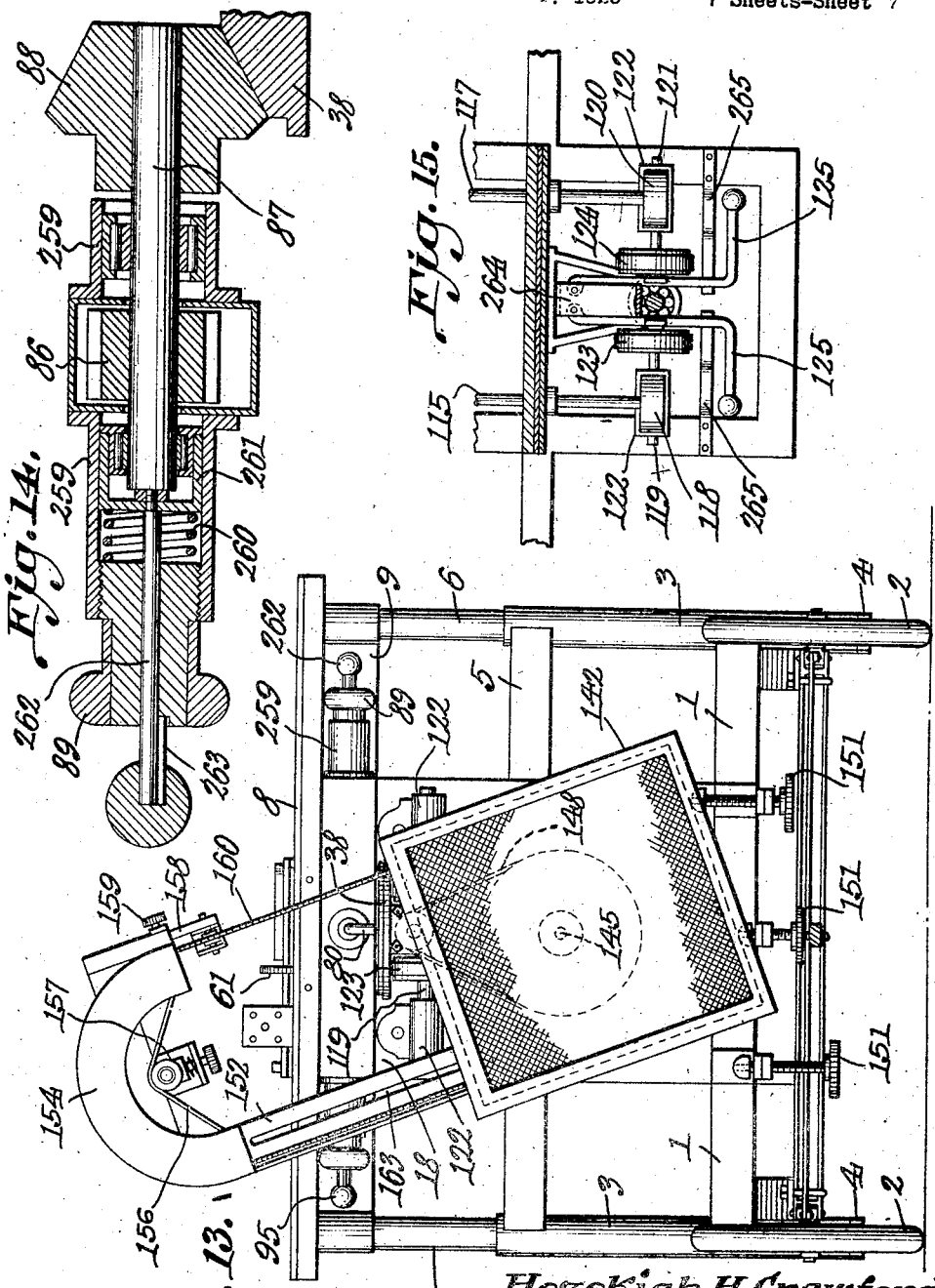

Patented Oct. 19, 1926.

1,603,583

UNITED STATES PATENT OFFICE.

HEZEKIAH H. CRAWFORD, OF EL PASO, TEXAS.

WOODWORKING MACHINE.

Application filed December 4, 1925. Serial No. 73,202.

This invention aims to provide a compound wood working machine comprising a plurality of tools adapted to be used in connection with carpentry and joining, novel means being provided for operating the tools, the machine being compact and portable, so that it may be moved readily from job to job.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1 shows in top plan, a device constructed in accordance with the invention; Figure 2 is a section on the line 2—2 of Figure 3; Figure 3 is a section on the line 3—3 of Figure 2; Figure 4 is a section on the line 4—4 of Figure 3; Figure 5 is a section on the line 5—5 of Figure 2; Figure 6 is a rear end elevation wherein parts are broken away; Figure 7 is a perspective view showing one of the posts and attendant parts; Figure 8 is a longitudinal section showing a portion of the feed mechanism; Figure 9 is a section on the line 9—9 of Figure 8; Figure 10 is a section on the line 10—10 of Figure 8; Figure 11 is a fragmental elevation showing a portion of the indicating mechanism; Figure 12 is a sectional view showing the return spring; Figure 13 is an end elevation showing the band saw frame tilted; Figure 14 is a sectional view of a portion of the gearing; Figure 15 is an elevation disclosing a part of the driving mechanism.

The device comprises a support. For convenience in describing the relative locations of parts, that end of the support to which the letter A is applied in Figures 1, 3 and 4, will be called the front end, that end of the support to which the reference letter B is applied being denominated the rear end. The support comprises a lower frame 1 carrying ground wheels 2, so that the support is in the nature of a truck, enabling the machine to be wheeled around readily from place to place. The lower frame 1 is secured to lower posts 3. See Figure 7. Jacks 4 are threaded into the lower ends of the posts 3. The jacks 4 may be used to hold the support rigidly in place, whilst the machine is in operation, with the wheels 2 out of engagement with the ground. An intermediate frame 5 is secured to the lower posts 3. Upper posts 6 slide for adjustment in the lower posts 3. Set screws 7 in the lower posts 3 engage the upper posts 6 and hold them in adjusted positions. A top 8 is mounted on the upper posts 6. An upper frame 9 is vertically adjustable on the upper posts 6. The upper frame 9 has depending racks 10 slidable on the posts 6 and 3. Pinions 11 mesh with the racks 10. The pinions 11 are mounted on the shafts 12 extended longitudinally of the machine and journaled on the lower frame 1. There are worm wheels 14 on the shafts 12. The worm wheels 14 mesh with worms 15 on a transverse shaft 16. The transverse shaft 16 is mounted to rotate on the lower frame 1 and is operated by detachable cranks 17 on the ends of the shaft.

Refer to Figures 2 and 5. There is a depending apron 18 on the upper frame 9 near to the rear end of the machine. The apron 18 has horizontally projecting arms 19, shown in Figure 5. The arms 19 support a platform 20. An engine 21, or other motor, is mounted on the platform 20. By means of a chain drive 22, or otherwise, the shaft of the engine 21 is connected with a horizontal countershaft 23 shown in Figure 5. The countershaft 23 is supported for rotation on the platform 20. Beveled gears 24 connect the inner end of the countershaft 23 with a vertical shaft 25. The shaft 25 is journaled intermediate its ends on a bearing 26. The bearing 26 projects forwardly from the apron 18. The lower end of the shaft 25 is journaled in a fan casing 27. The fan casing 27 is mounted on a bracket 28 projecting rearwardly from the apron 18. The fan casing 27 has an outlet 29. A fan 30 is secured to the lower end of the shaft 25 and is located in the casing 27.

The fan casing 27 is in communication with an upwardly and forwardly inclined conduit 31. The conduit 31 communicates with the rear end of a hopper 32 mounted on the upper frame 9. A worm conveyor 33 (Figure 2) operates in the bottom of the hopper 32. The worm conveyor 33 is carried by a shaft 34. The shaft 34 is journaled in the ends of the hopper 32 and in the apron 18. Intermeshing pinions 35 connect the shaft 34 with a shaft 36. The shaft 36 is journaled in the hopper 32 and in the apron 18. There is a friction wheel 37 on the rear end of the shaft 36. The friction wheel 37 engages the lower surface of a friction disk 38 mounted on the vertical shaft 25.

At this point it may be stated that by mounting a crank 39 on the forward end of the shaft 34, the engine 21 may be started through a train of elements comprising the crank 39, the shaft 34, the pinions 35, the shaft 36, the friction wheel 37, the friction disk 38, the shaft 25, the chain drive 22 (Figure 5) the countershaft 23, and the beveled pinions 24 which connect the countershaft 23 with the vertical shaft 25.

A hollow shaft 40 extends longitudinally of the machine and is journaled in the upper frame 9. Here compare Figures 2 and 8. A sleeve 41 is splined to the shaft 40. There are beveled friction wheels 42 and 43 on the sleeve 41. The friction wheels 42 and 43 engage with the friction disk 38 on the shaft 25. The sleeve 41 is moved lengthwise, to bring either of the friction wheels 42 and 43 into engagement with the friction disk 38, by means of a lever 44 fulcrumed on the frame 9 and engaged with the friction wheel 43. The lever 44 is operated by a rod 45 that extends to the front end of the machine.

Figure 8 shows that the hollow shaft 40 carries a head 46. A cylinder 47 encloses a portion of the shaft 40 and is mounted to slide on the head 46. The shaft 40 has longitudinal ribs 48 engaged with one end 49 of the cylinder 47. The result is that, although the cylinder 47 can move longitudinally of the piston rod or shaft 40, rotation will be imparted to the cylinder 47 when rotation is imparted to the shaft 40. The cylinder 47 is rotatable in a cross head 50 but cannot move lengthwise with respect to the cross head. The cross head 50 slides in guides 51 (Figure 3) on the upper frame 9. A head 52 (Figure 3) is threaded into the cylinder 47, and is fixed therein. The head 52 is attached to a shaft 53. The shaft 53 is connected at 54 to a tubular slide 55. The slide 55 is mounted for reciprocation in a tubular guide 56. The guide 56 is supported at one end, as at 57, for rotation on the frame 9, as shown in Figure 8, and is supported as at 58, as in Figure 2, on the frame 9 at the forward end of the machine. A transverse arbor 59 (Figure 3) is journaled in the slide 55. The guide 56 has longitudinal slots 60 receiving the bearings on the slide 55, wherein the arbor 59 is journaled, and permitting the slide 55 to move lengthwise in the guide 56. A saw 61 is mounted on one end of the arbor 59. A cutter 62 is mounted on the other end of the arbor 59. A shaft 63 is mounted for rotation, but against endwise movement, in the forward end of the guide 56. The shaft 63 carries a boring or mortising tool 64. Beveled gears 65 connect the shafts 53 and 63 with the arbor 59, so that when the shaft 53 is rotated by means of the cylinder 47 and the shaft 40, the arbor 59 and the shaft 63 will be rotated also. Refer to Figure 8. When fluid under pressure is admitted between the heads 52 and 46, the slide 55 will be moved to the right in Figure 3, along with the cross head 50. The parts specified are returned, to the left in Figure 3, by means of a flexible element 66 (Figure 12), wound on a drum 67 actuated by a spring 68 the drum being located within a casing 69 on any accessible part of the support, for instance, the upper frame 9. Figure 11 shows that there is a dial 70 on the forward end of the frame 9. The forward end of the tubular guide 56 has an index 71 adapted to cooperate with the dial 70. There is a gear segment 72 on the tubular guide 56. The gear segment 72 meshes with a worm 73 on an operating shaft 74 which is journaled on the upper frame 9. By means of the shaft 74, the worm 73 and the segment 72, the guide 56 may be rotated, carrying with it the tubular slide 55 and the arbor 59, thereby positioning the saw 61 and the cutter 62 at different angles with respect to the work.

A platform 75 is mounted at one end on the apron 18 (Figure 2) the other end of the platform 75 is sustained from the intermediate frame 5 by a longitudinally extensible hanger 76. A compressor 77 is mounted on the platform 75. There is a belt and pulley connection 78 between the shaft of the compressor 77 and the shaft 34. A pipe 79 extends between the compressor 77 and the tank 80 on the platform 75. A pipe 81 extends rearwardly from the tank 80. A three-way valve 82 is interposed in the pipe 81. The valve 82 is operated by a link 256 pivoted to a lever 257 fulcrumed at 258 on the frame 1. The pipe 81 is connected by a suitable union 83 of any desired kind with the hollow shaft or piston rod 40 (Figure 8) so that fluid under pressure may be delivered into the bore of the member 40.

A shaft 84 is journaled in the frame 9 at one side of the machine. The shaft 84 carries a cutter 85. By means of a sprocket drive 86, the cutter shaft 84 is connected with a transverse shaft 87 journaled in tubular members 259 on the frame 9. The shaft 87 is provided at its inner end with a friction wheel 88. The friction wheel 88 cooperates with the friction disk 38 on the shaft 25. An adjusting member 89 is threaded into the part 259, and, by way of a spring 260 (Fig. 14) and a slidable head 261, holds the friction wheel 88 engaged with the friction disk 38. A rod 262 slides in the part 89 and is connected to the head 261. The rod 262 has a lug 263. By pulling outwardly on the rod 262, and turning it, the lug 263 may be engaged with the end of the member 89 to hold the friction wheel 88 out of engagement with the disk 38.

A shaft 90 (Figure 3) is journaled in the frame 9, at a point about opposite to the cutter shaft 84. The shaft 90 carries a rotary sander 91. The sander 91 and the cutter 85 are adapted to cooperate with the material when the material is moved over rollers 161 journaled on a table 162 carried by the frame 5, it being understood that the frame 9 may be lowered, as hereinafter explained, depending upon the thickness of the work. The sander shaft 90 is connected by a sprocket drive 92 with a shaft 93 journaled in the frame 9. The shaft 93 is provided at its inner end with a friction wheel 94. The friction wheel 94 cooperates with the friction disk 38 on the shaft 25. The means 95 for maintaining the friction wheel 94 engaged with the friction disk 38 may be of the form hereinbefore described and shown in Fig. 14.

Refer to Figure 4. Vertically movable feed rolls 96 are mounted on the frame 9 on opposite sides of the cutter 85. The feed rolls 96 are pressed down on the work by spring arms 97 carried by cross pieces 98 on the frame 9. One cross piece 98 carries a support 99 on which a trough-shaped chute 100 is mounted. The chute 100 discharges into the hopper 32. A worm conveyor 101 operates in the chute 100. The worm conveyor 101 is carried by a shaft 102 journaled in the frame 9. The frame 9 carries a guard 103 disposed on the opposite side of the cutter 85 from the chute 100. Vertically movable feed rolls 104 (Figure 3) are located on opposite sides of the sander 91 and are carried by the frame 9. The shafts of the feed rolls 104 are designated by the reference numeral 109. A spring mechanism 105, corresponding to the parts 97 of Figure 4, holds the feed rolls 104 down on the work. Chutes 106 are mounted on the frame 9 on opposite sides of the sander 91. Worm conveyors 107 operate in the chutes 106. The chutes 106 discharge into the hopper 32. The shafts of the worm conveyors 107 are marked by the numeral 108. A sprocket drive 110 connects the shafts 109 of the feed rolls 104 with the shafts 108 of the worm conveyors 107. The shafts 111 of the feed rolls 96 are connected by a sprocket drive 112 with the shaft 102 of the worm conveyor 101. A worm drive 114 connects the shaft 109 of the innermost roll 104 with a longitudinal shaft 115 journaled on the frame 9. A worm drive 116 connects the shaft 111 of the innermost roll 96 with a longitudinal shaft 117 journaled on the frame 9. Referring to Figure 5, it will be observed that a worm drive 118 connects the shaft 115 with a transverse shaft 119. A worm drive 120 connects the shaft 117 with a transverse shaft 121. The shafts 121 and 119 are journaled in housings 122 for the worm drives 118 and 120, the housings being mounted to swing on the shafts 115 and 117. There is a friction wheel 123 on the inner end of the shaft 119. On the inner end of the shaft 121 there is a friction wheel 124. The friction wheels 123 and 124 cooperate with the lower surface of the friction disk 38 on the vertical shaft 25. The friction wheels 123 and 124 are shifted inwardly and outwardly, with respect to the friction disk 38, in order to vary the speed of rotation on the shafts 119 and 121, by levers 125 fulcrumed on a bracket 264 on the apron 18. The levers 125 are resilient, and can be sprung downwardly and swung outwardly, thereby to engage beneath keepers 265 on the frame of the machine, so as to hold the friction wheels 123 and 124 out of engagement with the disk 38.

The top 8 of the machine has an opening 127, (Figure 1) giving access to the sander 91. The part 8 has an opening 128 giving access to the cutter 85. The top member 8 has an opening 129 of considerable size, through which the saw 61 extends. A work table 130 is slidably mounted in the opening 129 of the top member 8. A work table 131 is similarly mounted in the opening 129. The work tables 130 and 131 have racks 132 on their lower surfaces. The racks 132 engage with pinions 133 on the shafts 134 journaled on the top member 8. The shafts 134 carry hand wheels 135 or the like, located at the forward end of the machine and facilitating the rotation of the shafts 134. A guide 136 is mounted slidably on the work table 130 and is moved by a mechanism indicated generally by the numeral 137. Guides or stops 138 are pivoted at 139 to the tables 130 and 131 and are adapted to be engaged in openings 140 in the tables.

A radiator 141 is mounted on the forward end of the platform 27. A shaft 145 is journaled in the frame work of the radiator. There is a pulley 146 on the inner end of the shaft 145. A shaft 149 is supported for rotation on the top of the radiator 141. A pulley 147 is carried by the shaft 149. About the pulleys 146 and 147, a belt 148 is engaged. The shaft 149 carries a friction wheel 150 which engages the lower surface of the friction disk 38. A casing 142 is mounted to swing on the shaft 145 and is sustained in adjusted positions by screws 151 mounted in the part 28. A fan 143 is mounted on the shaft 145 within the casing 142. The fan 143 has a rim 144.

A saw carrier 152 in the form of a vertical angle bar (Figures 6, 13 and 3) is slidably mounted in engagement with the back of the casing 142. The saw carrier 152 has an elongated slot 163 in which are engaged clamp bolts 153 which hold the saw carrier on the casing 142 for vertical adjustment. At its upper end, the saw carrier 152 has an arcuate head 154. Rollers 155 are journaled in the head 154. About the rollers 155 is engaged a belt 156. The lower intermediate portion of the belt 156 cooperates with a tightener 157 on the head 154. At its free end, the head 154 carries a vertically adjustable guide 158. The guide 158 is held in adjusted positions by a set screw 159 or the like, threaded into a portion of the head 154. A band saw 160 bears on the belt 158 and is supported by the rollers 155. The band saw 160 is passed about the rim 144 of the fan 143. On the forward end of the machine there is a work clamp or vise 164.

The friction disk 38 is operated by a train of elements including the engine 21, the driving connection 22, the countershaft 23, the beveled pinions 24, and the shaft 25.

The compressor 77 is driven from the friction disk 38 by the friction wheel 37, the shaft 36, the gears 35, the shaft 34 and the belt connection 78. The shaft 34 operates the worm conveyor 33.

From the friction disk 38, direct or reverse rotation is imparted to the shaft 40 by way of the friction wheels 42 and 43 on the sleeve 41. Through the medium of the rod 45 and the lever 44, the sleeve 41 may be slid endwise to bring either of the friction wheels 42 or 43 into engagement with the friction disk 38. The shaft 40 imparts rotation to the cylinder 47 by way of the ribs 48, and the piston 47, being connected by the head 52 to the shaft 53, rotates the shaft 53. The beveled gears 65 pass rotation from the shaft 53 to the arbor 59 and to the saw 61, as well as to the shaft 63 and the tool 64.

By a proper manipulation of the pedal lever 257, the three-way valve 82 shown in Figure 2 is operated, and fluid pressure delivered to the tank 80 through the pipe 79, from the compressor 77, is governed as it passes from the tank 80 through the pipe 81, the pipe 81 delivering fluid pressure through the union 83 into the bore of the hollow piston rod or shaft 40. The fluid pressure passes between the heads 46 and 52. In this way, the cylinder 47 may be caused to move to the right in Figure 3, carrying with it the shaft 63 and the slide 55, the saw 61 and the cutter 62, together with the tool 64, being moved accordingly, and it being possible to extend the tool 64 beyond the forward end of the tubular guide 56, so that the tool 64 can be used. When the parts specified move to the right in Figure 3, they carry with them the cross head 50, and the flexible element 66 is extended, the drum 67 of Figure 12 being rotated, and the spring 68 being put under tension, the spring constituting means for returning the cross head 50 and the parts assembled therewith, to the position shown in Figure 3, when pressure is let off by proper manipulation of the three-way valve 82.

The upper frame 9, which carries practically all of the working parts of the machine, may be raised and lowered through the instrumentality of the cranks 17, the shaft 16, the worm 15, the worm wheel 14, the shaft 12, the pinion 11, and the racks 10. In this way, the frame 9 may be lowered to bring the cutter 85, and the sander 91, into operative relation to the work which is slid over the table 162 on the rollers 161.

Beginning with the friction wheel 94, that wheel is rotated by the friction disk 38 on the shaft 25. The friction wheel 94 rotates the shaft 93 and the sprocket connection 92 rotates the sander 91. The conveyors 107 and the feed rolls 104 are linked together by the sprocket drive 110. The innermost roll 104 is operated by the worm drive 114, the shaft 115, the worm drive 118, the shaft 119, the friction wheel 123, and the friction disk 38.

The cutter 85 is operated by the sprocket drive 86, the shaft 87, the friction wheel 88 and the friction disk 38. The sprocket drive 112 yokes together the feed rollers 96 and the conveyor 101. The innermost roll 96 is driven by the worm drive 116, the shaft 117, the worm drive 120, the shaft 121, the friction wheel 124, and the friction disk 38.

The shaft 149 derives motion from the friction disk 38 by way of the friction wheel 150, the pulley 147 and the belt 148 cooperating with the pulley 146 to rotate the shaft 145 and the fan 143, the rim 144 of the fan wheel operating the band saw 160. By loosening the bolts 153, the band saw carrier 152 may be lowered when there is no occasion for using the band saw 160. As shown in Fig. 13, the casing 142 and the band saw carrier may be swung on the shaft 145, and be held in adjusted position by the screws 151, the position of the band saw 160 being changed accordingly.

The chips and dust are received in the hopper 32 and are advanced by the conveyor 33 into the conduit 31, the aforesaid loose material passing into the fan casing 27 and being expelled through the outlet 29 of the fan casing, by the action of the fan 30, which is driven by the shaft 25.

Although an engine has been shown at 21, it will be understood that an electric motor, or any other driving means, may be substituted for the engine.

What is claimed is:—

1. In a device of the class described, a support, an engine on the support, a radiator for the engine, a cooling fan for the radiator, means for driving the fan from the engine, a band saw engaged with the fan to be driven thereby, and a support for the band saw.

2. In a device of the class described, a support, an engine on the support, a radiator for the engine, a cooling fan for the radiator, means for driving the fan from the engine, a band saw engaged with the fan to be driven thereby, a support for the band saw, and means for mounting the saw for vertical adjustment.

3. In a device of the class described, a support, a tool carrier slidable on the support, a hopper receiving waste material from the tool on the carrier, a conveyor in the hopper, fluid pressure means for sliding the tool carrier, and including a compressor, means for driving the compressor from the conveyor, and means for operating the conveyor.

4. In a device of the class described, a support, a tool carrier slidable on the support, a hopper receiving waste material from the tool on the carrier, a conveyor in the hopper, fluid pressure means for sliding the tool carrier and including a compressor, means for driving the compressor from the conveyor, a fan casing, means for conveying waste material from the hopper to the fan casing, a fan operating in the fan casing, a shaft carrying the fan, means for driving the shaft, and means for connecting the shaft operatively with the conveyor.

5. In a device of the class described, a support, a tool carrier slidable on the support, a rotatable tool on the carrier, mechanism for rotating the tool, a hopper receiving waste material from the tool, a conveyor in the hopper, fluid pressure means for sliding the tool carrier and including a compressor, means for driving the compressor from the conveyor, and means for operating the conveyor, said means being engaged operatively with said mechanism thereby to rotate the tool.

6. In a device of the class described, a support, a tool on the support, a hopper receiving waste material from the tool, a conveyor operating in the hopper, a shaft carrying the conveyor, a second shaft, intermeshing gear wheels on the shafts, a third shaft, an engine operatively connected with the third shaft, a friction disk on the third shaft, and a friction wheel on the second shaft and engaging the friction disk.

7. In a device of the class described, a support, a slide mounted for reciprocation on the support, a tool journaled on the slide, a hollow shaft rotatably mounted on the support and having a head, a cylinder mounted to slide on the head, means for connecting the cylinder with the tool, to secure rotation of the tool, means for connecting the cylinder with the hollow shaft to secure rotation of the hollow shaft and the cylinder together, means for discharging fluid pressure through the hollow shaft between the head and one end of the cylinder to secure longitudinal movement of the cylinder, and means for rotating the hollow shaft.

8. In a device of the class described, a support, a first tool located adjacent to the longitudinal center of the support, means for rotating the first tool, means for moving the first tool longitudinally of the support, second tools rotatable on the support and located on opposite sides of the first tool, a hopper receiving waste material from the first tool, chutes receiving material from the second tools, and discharging into the hopper, conveyors in the hopper and in the chutes, and means for operating the conveyors.

In testimony that I claim the foregoing as my own, I have hereto affixed my signature.

HEZEKIAH H. CRAWFORD.